US012500369B2

(12) United States Patent
Blendl et al.

(10) Patent No.: US 12,500,369 B2
(45) Date of Patent: Dec. 16, 2025

(54) PROTECTIVE HOUSING FOR ELECTRICAL CONNECTORS

(71) Applicant: REVONEER GMBH, Holzkirchen (DE)

(72) Inventors: Victoria Blendl, Munich (DE); Dominik Blendl, Munich (DE)

(73) Assignee: Revoneer GMBH, Deutschland (DE)

( * ) Notice: Subject to any disclaimer, the term of this patent is extended or adjusted under 35 U.S.C. 154(b) by 363 days.

(21) Appl. No.: 17/927,160

(22) PCT Filed: Apr. 12, 2021

(86) PCT No.: PCT/EP2021/059468
§ 371 (c)(1),
(2) Date: Nov. 22, 2022

(87) PCT Pub. No.: WO2021/239312
PCT Pub. Date: Dec. 2, 2021

(65) Prior Publication Data
US 2023/0198194 A1 Jun. 22, 2023

(30) Foreign Application Priority Data
May 27, 2020 (DE) .................... 10 2020 114 197.1

(51) Int. Cl.
*H01R 13/514* (2006.01)
*H01R 13/453* (2006.01)

(52) U.S. Cl.
CPC ....... *H01R 13/514* (2013.01); *H01R 13/4536* (2013.01)

(58) Field of Classification Search
CPC .............. H01R 13/514; H01R 13/4536; H01R 13/4361; H01R 13/639
See application file for complete search history.

(56) References Cited

U.S. PATENT DOCUMENTS 1,304,075 A * 5/1919 Lofgren ............... H01R 13/625 439/319
1,604,836 A * 10/1926 Moldenhauer ....... B60Q 1/2615 439/336
(Continued)

FOREIGN PATENT DOCUMENTS

CN 2930209 8/2007
CN 107220696 A 9/2017
(Continued)

OTHER PUBLICATIONS

International Search Report, PCT/EP2021/059468, Aug. 24, 2021, pp. 1-4.

*Primary Examiner* — Thanh Tam T Le
(74) *Attorney, Agent, or Firm* — Armis IP Law, LLC

(57) ABSTRACT

The invention relates to a protective housing (1) for electrical connectors (5) of electrical cables (4). According to the invention, the protective housing (1) has an inner housing (2) which is designed to accommodate the electrical connector (5), and an outer housing (3) which is designed to accommodate the inner housing (2), wherein the inner housing (2) and the outer housing (3) are designed to permit a movement of the inner housing (2) within the outer housing (3) exclusively along a defined trajectory and to therefore bring the inner housing from an initial position to a connecting position.

8 Claims, 4 Drawing Sheets

Section along y-line

(56) References Cited

U.S. PATENT DOCUMENTS

| | | | | | |
|---|---|---|---|---|---|
| 4,045,106 | A * | 8/1977 | Borg | H01R 13/635 | 439/152 |
| 5,372,515 | A * | 12/1994 | Miller | H01R 13/6485 | 439/138 |
| 5,603,624 | A * | 2/1997 | Taguchi | H01R 13/62933 | 439/372 |
| 5,716,224 | A * | 2/1998 | Masuda | H01R 13/4536 | 439/138 |
| 6,227,904 | B1 * | 5/2001 | Wang | H01R 13/6583 | 439/63 |
| 6,364,681 | B1 * | 4/2002 | Watanabe | H01R 13/625 | 439/533 |
| 6,428,333 | B1 | 8/2002 | Rust | | |
| 6,554,626 | B2 * | 4/2003 | Ramos, Jr. | H01R 13/405 | 439/372 |
| 6,824,406 | B1 * | 11/2004 | Sharples | H01R 13/62977 | 439/157 |
| 6,979,213 | B1 * | 12/2005 | Mauney | H01R 13/193 | 439/157 |
| 7,070,438 | B2 * | 7/2006 | Dillon | H01R 13/62977 | 439/372 |
| 7,081,001 | B1 * | 7/2006 | Conroy | H01R 13/625 | 439/314 |
| 7,241,155 | B2 * | 7/2007 | Tyler | H01R 13/62944 | 439/372 |
| 7,419,390 | B2 * | 9/2008 | Ohtaka | H01R 13/62955 | 439/372 |
| 8,297,992 | B2 * | 10/2012 | Park | H01R 13/6295 | 439/157 |
| 9,196,997 | B2 * | 11/2015 | Sanders | G02B 6/3825 | |
| 9,287,665 | B2 * | 3/2016 | Watanabe | H01R 13/4536 | |
| 9,407,038 | B2 * | 8/2016 | Jozwiak | H01R 13/62961 | |
| 9,477,060 | B2 * | 10/2016 | Sales Casals | H01R 13/5202 | |
| 9,843,131 | B2 * | 12/2017 | Kim | H01R 13/625 | |
| 10,608,375 | B2 * | 3/2020 | Homme | H01R 13/629 | |
| 11,070,013 | B2 * | 7/2021 | Brandt | H01R 24/542 | |
| 11,146,020 | B2 * | 10/2021 | Watanabe | H01R 13/514 | |

FOREIGN PATENT DOCUMENTS

| | | | |
|---|---|---|---|
| DE | 4108468 | A1 | 9/1991 |
| DE | 69107937 | T2 | 7/1995 |
| DE | 102007053415 | A1 | 5/2009 |
| EP | 0881729 | A2 | 12/1998 |
| EP | 1557907 | A2 | 7/2005 |
| EP | 3554202 | A1 | 10/2019 |
| GB | 2533930 | A | 7/2016 |

* cited by examiner

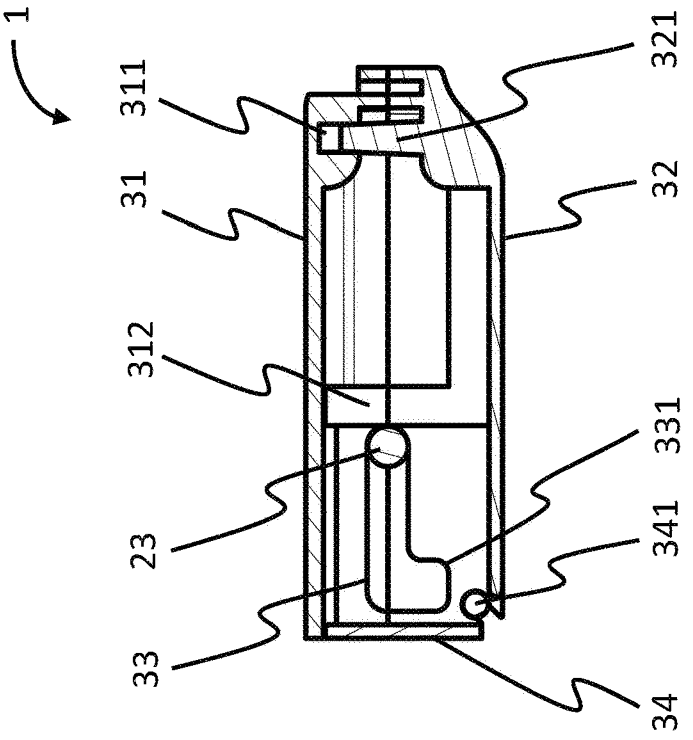
Fig. 2 - Section along x-line
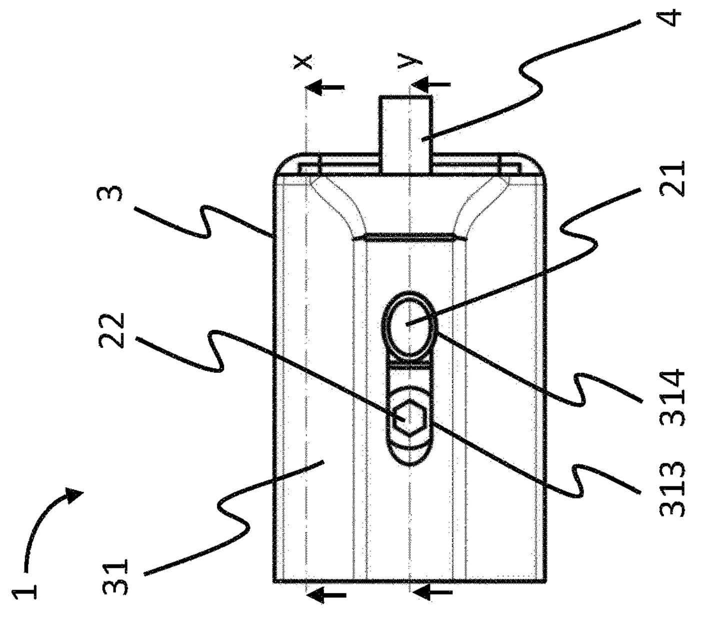
Fig. 1

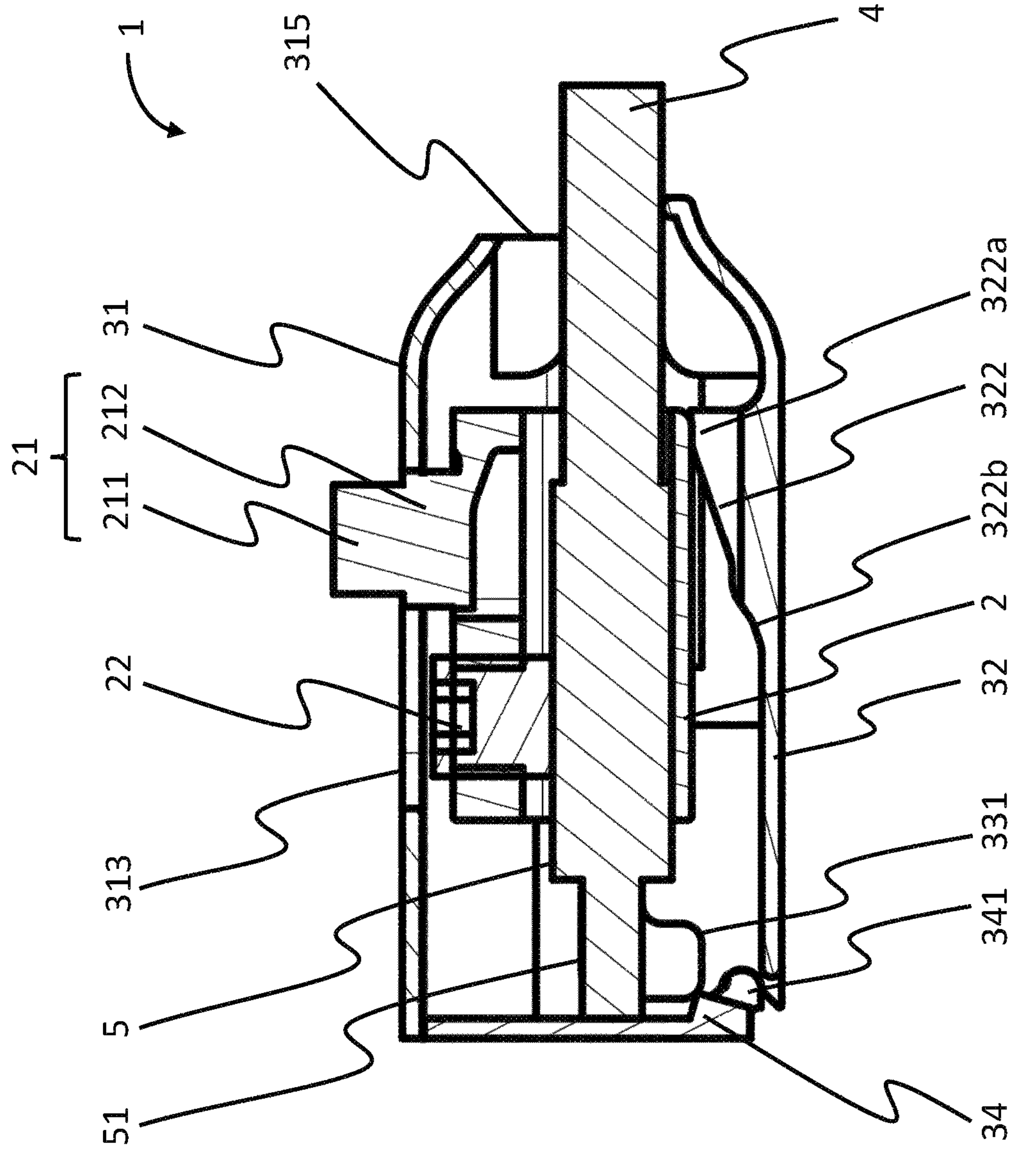
Fig. 3 - Section along y-line

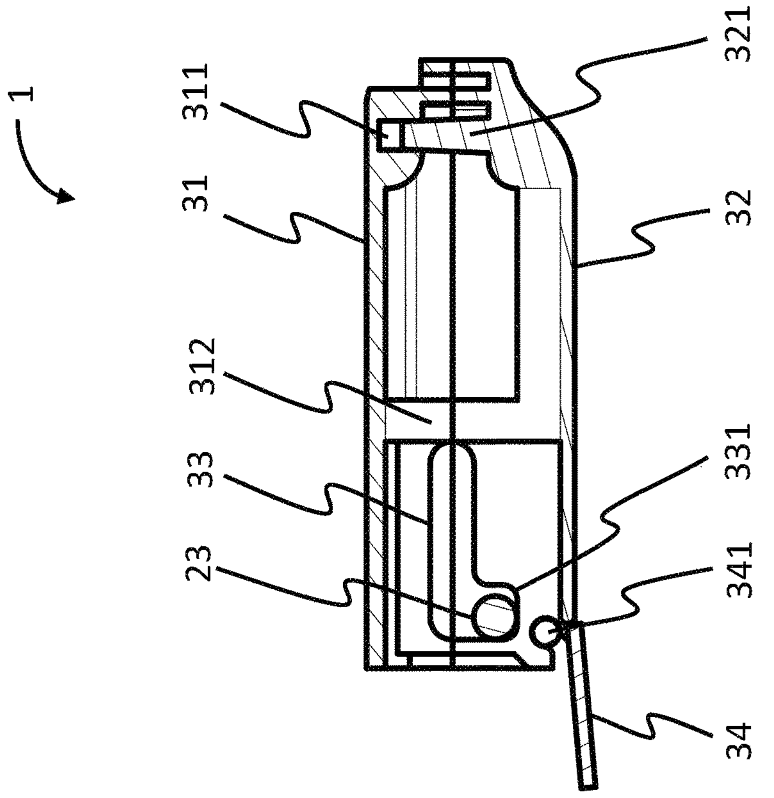
Fig. 5 — Section along x-line
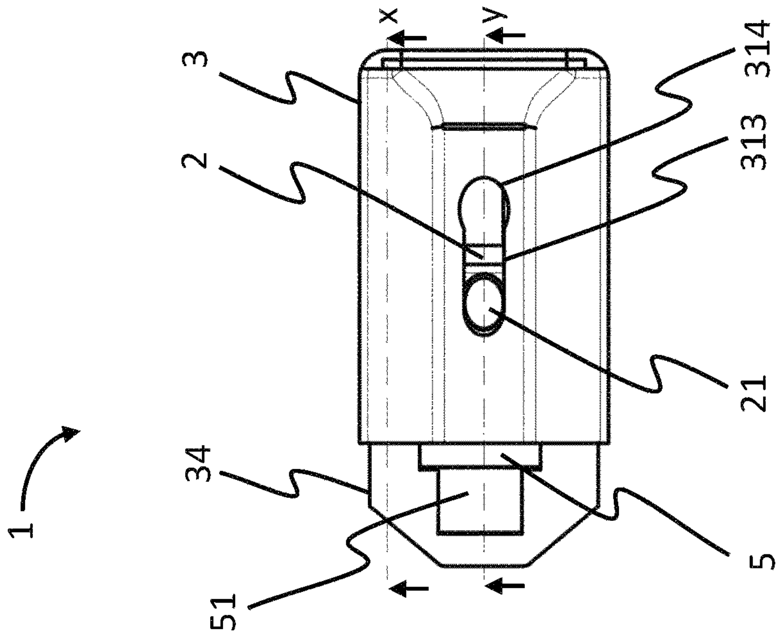
Fig. 4

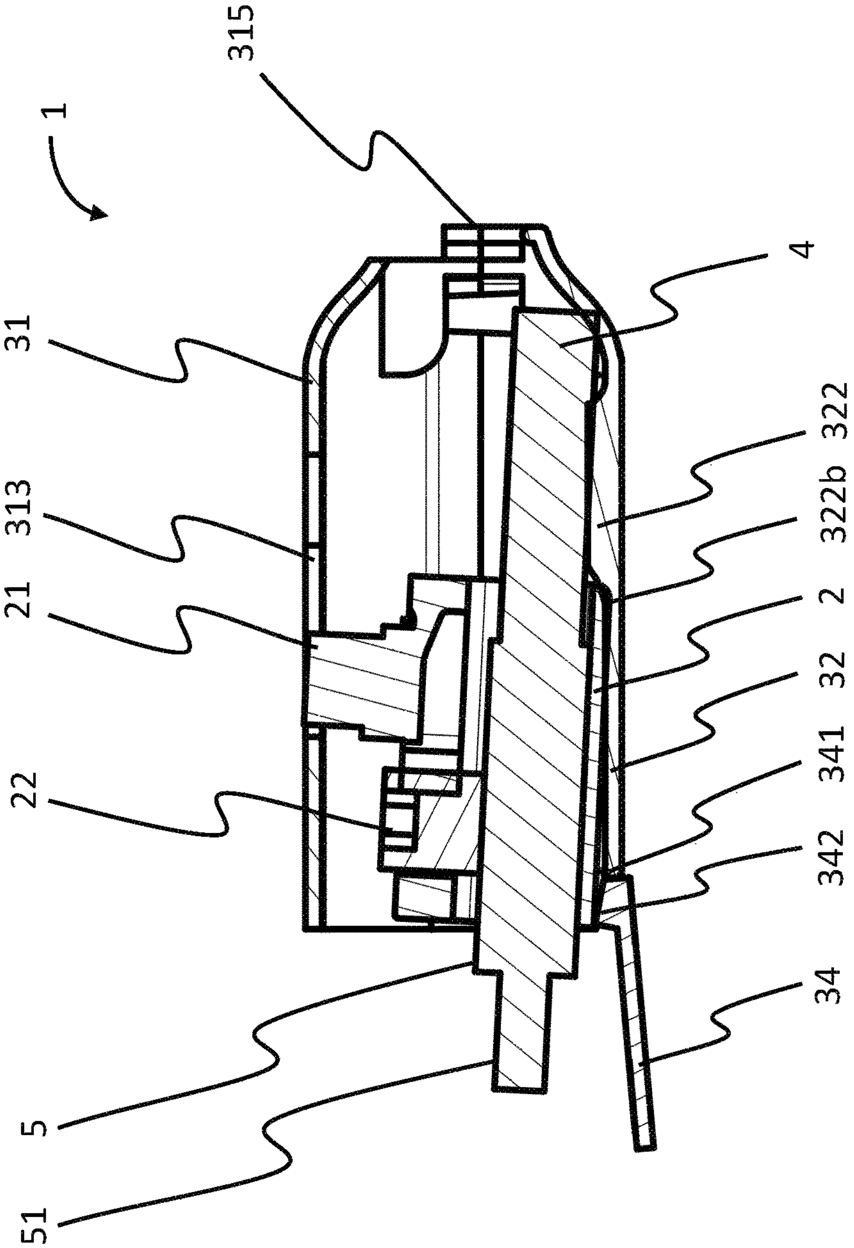
Fig. 6 - Section along y-line

PROTECTIVE HOUSING FOR ELECTRICAL CONNECTORS

The invention relates to a protective housing for electrical connectors of electrical cables.

In modern everyday life, electrical devices such as smartphones, tablets or other technical devices are indispensable. In order to enable the exchange of data between the devices or the charging of batteries, electrical cables are used, which have different electrical connectors, such as USB, micro-USB, Apple Lightning, etc., and thus different shapes of connectors. Thus, in the context of this application, connector means the corresponding electrical connection and, where applicable, the shape made from metal and/or plastics surrounding this connection.

The daily use of these cables and connectors causes considerable wear and tear, which quickly leads to damage, particularly at the inflexible and therefore brittle transition between cable and connector. Moreover, both the connector itself and, above all, the electrical contact of the connector, which is usually of a filigree design, are not protected from external influences and can easily be damaged by pets or playing children if they are stored carelessly, or they can become heavily soiled to the extent that they have to be cleaned at great expense before the next use or can no longer be used at all.

The present invention is based on the object of avoiding the aforementioned damage and better protecting the connector from external influences. This object is achieved by the protective housing according to the invention according to the main claim. Advantageous refinements of the invention are included in the subclaims.

The protective housing according to the invention for an electrical connector comprises according to the invention an inner housing and an outer housing. The inner housing is configured to accommodate therein the electrical connector which is fixedly connected to the cable. The outer housing, in turn, is configured to accommodate the inner housing including the connector, with the cable attached to the connector being fed out of the outer housing on one side. The inner housing and outer housing are designed in such a manner that a movement of the inner housing within the outer housing is possible exclusively along a defined trajectory in order to transfer it from an initial position to a connecting position. Analogously, the protective housing is thus in an initial state when the inner housing is in the initial position and in a connection state when the inner housing is in the connecting position.

The initial position of the inner housing and thus of the connector is defined as the position in which the connector is situated completely inside the protective housing and thus the connector is protected from external influences in the best possible way. A connection of the connector to an electrical device is not possible in this position. If the cable and thus also the electrical connector is not used, the inner housing should be in this position in order to achieve the greatest possible protection of the connector.

In order to connect the electrical contact of the connector to an electrical terminal, the inner housing including the connector must be transferred to a connecting position. In this position, at least the electrical contact of the connector protrudes from one side of the protective housing to such an extent that it can be connected to the terminal.

The path covered by the inner housing during the transfer from the initial position to the connecting position is defined as a trajectory. The latter is identical for each change from the initial position to the connecting position and is thus fixed (defined). When changing from the connecting position to the initial position, the inner housing consequently covers the trajectory backwards, i.e. in the opposite direction.

In an advantageous embodiment of the invention, this trajectory does not run linearly. As the term already suggests, a linear trajectory does not exhibit any change in direction but extends along an axis without any curve or kinks. This embodiment is particularly advantageous when the trajectory has a change in direction of 90°. Since a movement of the inner housing is only possible along the trajectory, this embodiment makes it possible that in one position, for example the connecting position, the inner housing is able to absorb a force in a different direction than would be possible without the change in direction. For example, it can be achieved that in the connecting position, a force in the connecting direction between the connector and the electrical device can be absorbed by the inner housing since the trajectory in the connecting position of the inner housing extends perpendicular to this connecting direction. This advantage is explained in more detail below with reference to the accompanying figures.

In a further advantageous embodiment of the invention, the trajectory of the movement of the inner housing in the outer housing is defined by a sliding track located in the outer housing. In this case, the inner housing has a guide element which is guided in the sliding track of the outer housing. By guiding the guide element in the sliding track, it is possible to move the inner housing exclusively along the sliding track, thereby defining the trajectory. The sliding track is formed here by an indentation, for example a simple groove, or a recess in the outer housing. Its dimensions depend on the dimensions of the guide element that is guided therein. In this manner, a trajectory can be obtained with means that are easy to manufacture and with little associated cost and resource expenditure.

Furthermore, an embodiment of the protective housing is advantageous if the inner housing has a fastening element and/or an actuating element. The fastening element serves to fix the connector of the electric cable in the inner housing so that a movement of the connector is only possible by a movement of the inner housing. Advantageously, this fastening element consists of a grub screw and a soft material, such as hard rubber or plastics, in order to prevent damage to the connector when it is fastened in the inner housing. In other embodiments of the invention, the connector can also be fixed in the inner housing by means other than a fastening element.

The actuating element of the inner housing serves as an interface to a user who can exert a force on the actuating element and thus can move the inner housing along the trajectory within the outer housing and change its position.

Also possible are embodiments of the invention in which the inner housing still has an actuating element as described above but does not have a fastening element. In order to prevent a movement of the connector within the inner housing in this embodiment, the inner housing is cast/injection-molded around the connector and is thus firmly attached to it. Thus, a separate fastening element is not necessary. This has the advantage of reducing the complexity of the protective housing and increasing operating safety by a reduced number of components. Moreover, as a result of this, a design of the subject according to the invention with smaller dimensions is conceivable.

In another advantageous embodiment of the invention, a movement of the inner housing out of the initial position is possible only by two different, in particular sequentially performed movements of the actuating element. In this manner, a child lock-type device can be implemented and, moreover, it can be ensured that the probability of an unintentional movement of the inner housing in the initial position can be reduced. With regard to a possible constructive implementation of such an embodiment, reference is made at this point to the explanations with regard to the embodiment according to the invention illustrated in the attached figures.

In another advantageous embodiment of the invention, the outer housing has a closable opening on one side of the protective housing, which is designed to open or close depending on the movement of the inner housing and thus of the connector. If the inner housing is in the connecting position, the closable opening is open so that at least the electrical contact of the connector protrudes from the outer housing and the electrical terminal can be connected to the connector. If, on the other hand, the inner housing is in the initial position, the closable opening is closed, whereby the connector can be protected in the best possible way.

Furthermore, the embodiment of the invention is advantageous if the closable opening is closable by a flap which, furthermore, is advantageous if it has an over-opening element configured to open the flap at an angle greater than 90° depending on the position of the inner housing. The indication of the angle refers to its closed state. This is the position that the flap assumes when the inner housing is in the initial position and the flap closes the closable opening. For more detailed constructive implementation, reference is also to be made at this point to the explanations of the embodiment according to the invention illustrated in the figures.

In another advantageous embodiment of the invention, the flap has a reset mechanism configured to exert a force on the flap to bring it into the closed state. In this manner, the best possible protection of the connector and the electrical contact can always be ensured when there is no connection between the connector and the terminal. This embodiment is particularly advantageous if the reset mechanism is formed by at least one spring or at least one elastic band since they offer particularly simple possibilities for constructive implementation and thus reduce the costs of the protective housing.

In another advantageous embodiment of the invention, the outer housing has a ramp on its inner side. The ramp has a thick end and a thin end (in the height direction) and is configured to serve as a supporting surface for the inner housing and is thus arranged below the inner housing. Here, the inner housing rests on a thick end of the ramp in the initial position and on a thin end of the ramp in the connecting position. Thus, the inner housing and therefore the connector is in a higher position in the initial position than in the connecting position, as a result of which the connector can have a slight inclination in the connecting position and thus facilitates connecting the terminal to the connector. The width of the ramp perpendicular to the direction of movement of the inner housing is not relevant so that the ramp can also be formed by merely a thin web with an appropriate profile. In another embodiment of the invention, the change in height achieved by the ramp during the transfer from the initial position to the connecting position, in particular of the part of the inner housing facing away from the electrical contact of the connector, can also be implemented, for example, by means of a second sliding track in the outer housing in which a second guide element of the inner housing engages and thus defines the movement of the outer housing.

In another advantageous embodiment of the invention, the protective housing has a reset mechanism which is designed to exert a force on the inner housing in order to bring the latter into the initial position and hold it therein, depending on its position. In this manner, it can be ensured that the inner housing including the connector is located inside the outer housing and is thus protected when the terminal is not connected to the connector. This reset mechanism is particularly advantageous if it includes at least one spring or a rubber band since they represent a structurally simple and inexpensive solution for implementing the reset mechanism.

In an advantageous embodiment of the invention, the reset mechanism of the inner housing can correspond to the reset mechanism of the flap which closes the closable opening of the outer housing in the initial position, or can be implemented together with the latter, so that only one reset mechanism for the inner housing and flap together needs to be provided in the protective housing.

The invention is explained in more detail below with reference to several figures. The figures show in detail:

FIG. 1 shows an embodiment of the protective housing according to the invention in plan view in the initial state.

FIG. 2 shows the embodiment shown in FIG. 1 in a sectional view along the x-line in the initial state.

FIG. 3 shows the embodiment shown in FIG. 1 in a sectional view along the y-line in the initial state.

FIG. 4 shows the embodiment shown in FIG. 1 in plan view in the connection state.

FIG. 5 shows the embodiment shown in FIG. 1 in a sectional view along the x-line in the connection state.

FIG. 6 shows the embodiment shown in FIG. 1 in a sectional view along the y-line in the connection state.

FIG. 1 shows a plan view of an embodiment of the protective housing 1 according to the invention. Shown is the outer housing 3 which surrounds an inner housing 2 that is barely visible in the external view. On the one side of the outer housing 3, a cable 4 is fed out which is connected to an electrical connector 5 located in the inner housing 2. The outer housing 3 has an upper part 31 and a lower part 32 (see sectional views of FIGS. 2 and 3). An elongated hole 313 is formed in the upper part 31 of the outer housing 3, this elongated hole 313 having a widening 314 on the side facing the cable 4. Through the elongated hole 313, a view of a small part of the inner housing 2 is visible, wherein in particular a grub screw 22 (fastening element 22), which serves for fastening the electrical connector 5 in the inner housing 2, and an actuating element 21, which is elliptical in plan view, are visible. In the illustrated state of the protective housing 1, the actuating element 21 is located in the widening 314 of the elongated hole 313. The electrical contact 51 of the connector 5 cannot be seen in FIG. 1 and is located completely inside the protective housing 1. The inner housing 2 is in the initial position.

FIG. 2 shows the same embodiment of the protective housing 1 according to the invention as FIG. 1 in a sectional view along the line x shown in FIG. 1. Here, the above-described division of the outer housing 3 into upper part 31 and lower part 32 is clearly visible. In this embodiment, the two parts are connected to each other by means of a plurality of connecting pins 321 in the lower part 32, which engage in corresponding connection recesses 311 of the upper part 31. In approximately the center of FIG. 2, a plug connection 312 is indicated which is also designed to connect the upper part 31 and the lower part 32. Of course, other known types of connection between the upper part 31 and the lower part 32 are also conceivable in other embodiments.

Furthermore, on the side opposite the outlet of the cable 4, the outer housing 3 has a flap 34 which is mounted by means of a joint 341 and closes the opening between the upper part 31 and the lower part 32 of the outer housing 3 in the illustrated position of the inner housing 2.

Of the inner housing 2, only a guide element 23 is visible in the sectional view shown in FIG. 2, which is firmly connected to the inner housing 2. Thus, when the guide element 23 moves, the inner housing 2 moves in the same way. The guide element 23 is located in a sliding track 33 which in the present embodiment is formed as a groove in the outer housing 3 and has the same length as the elongated hole 313 in the outer housing 3. The dimensions of the groove correspond approximately to the dimensions of the guide element 23, so that the latter has no significant play in the groove. Starting from the illustrated position of the guide element 23 in FIG. 2, the sliding track 33 initially extends in a horizontal direction and then, on the side closer to the flap 34 of the outer housing 3, has a change of direction by 90° downwards, i.e. in the direction of the lower part 32 of the outer housing 3, resulting in an engagement recess 331 which has a width slightly different with respect to the groove of the remaining sliding track 33. Thus, due to the change in direction starting from the illustrated position of the guide element 23, the sliding track 33 first allows the guide element 23 to move horizontally in the direction of the flap 34 and finally to move perpendicularly thereto downwards into the engagement recess 331.

FIG. 3 shows the same embodiment of the protective housing 1 according to the invention as FIG. 1 and FIG. 2 in a sectional view along the line y shown in FIG. 1. As in FIG. 2, the upper part 31 and lower part 32 can be seen, as well as the flap 34 and the joint 341 of the outer housing 3. Also visible is the engagement recess 331 of the sliding track 33. Furthermore, the lower part 32 has a substantially wedge-shaped ramp 322. The latter, in turn, as the term wedge-shaped already suggests, has a thick end 322*a* and a thin end 322*b* in the height direction (vertical direction in the drawing plane) so that the thin end 322*b* is closer to the flap 34 than the thick end 322*a*.

In the illustrated state of the protective housing 1, the inner housing 2, which is clearly visible in this sectional view, rests with its end facing the cable 4 on the thick end 322*a* of the ramp 322. The opposite end of the inner housing 2, thus, the one closer to the flap 34, is supported in the sliding track 33 by the guide element 23, which is not visible in this sectional view, so that the inner housing 2 is in a horizontal position inside the outer housing. The cable 4 is fed out of the outer housing from a cable opening 315.

Inside the inner housing 2 there is the connector 5, which is fixedly connected to the cable 4 and, on the side opposite the cable, has an electrical contact 51 which, in turn, projects out of the inner housing 2. In this case, the connector 5 is fastened to the inner housing 2 by a grub screw 22 (fastening means 22), so that the connector 5 moves with the inner housing 2. Furthermore, FIG. 3 shows the actuating means 21 of the protective housing 1 in more detail. It protrudes from the elongated hole 313 on the upper part 31 of the outer housing 3 already shown in FIG. 1 so that it can be operated by the user. Furthermore, it is connected to the inner housing 2 only on one side, so that in the case of vertical pressure on the actuating element 21, the connection between the actuating element 21 and the inner housing 2 can slightly deform and it can move downwards in the vertical direction in the drawing plane. In addition, the actuating element 21 has two different thicknesses, thus, a step in cross-section, with the thinner portion 211 protruding from the outer housing 3 in the illustrated initial position of the inner housing 2, and the thicker portion 212 ending flush with the outer housing 3.

FIGS. 4 to 6 show the exact same embodiment in the exact same views as FIGS. 1 to 3. However, in FIGS. 1 to 3, the inner housing 2 is in the initial position, thus, the protective housing is in the state in which no connection is possible between the electrical contact 51 of the connector 5 and the corresponding terminal, but the connector 5 is protected in the best possible way. FIGS. 4 to 6, on the other hand, show the protective housing 1 in the connection state, in which a connection between the connector 5 and the terminal is possible. Due to the great similarities between FIGS. 1 to 3 and FIGS. 4 to 6 in each case, only the differences between the figures will be discussed below.

It can be seen in FIG. 4 that the flap 34 of the outer housing 3 has opened due to the position of the inner housing 2 including the connector 5, which position has changed in contrast to FIG. 1. Part of the connector 5, in particular the electrical contact 51, now protrudes from the outer housing 3 in order to be connected to the corresponding terminal. Consequently, the position of the actuating element 21 has also changed. Compared to FIG. 1, it is now located at the other end of the elongated hole 313.

In contrast to the illustration in FIG. 2, the illustration in FIG. 5 shows an open flap 34 (see also FIG. 4) and a changed position of the guide element 23 in the sliding track 33. The guide element 23 is now located in the engagement recess 331. In this view, the advantage of such a recess also becomes clear. As already mentioned, the protective housing 1 in the form illustrated in FIG. 5 is in the connection state in which the terminal is connected to the connector 5. To achieve this, a slight force must be applied to the connector 5 (see also FIG. 6), which force acts in a substantially horizontal direction from left to right in the drawing plane.

In FIG. 6, it can be seen that in the connecting position, the entire inner housing 2 is in a lower position than in the initial position. This can be seen, on the one hand, from the fact that the actuating element 21 is sunk significantly further into the outer housing in the connection state and, on the other hand, from the fact that the inner housing 2 rests on the bottom of the outer housing 3. Here, in contrast to FIG. 3, the rear part of the inner housing 2, thus the part which is further away from the flap 34, no longer rests on the thick end 322*a* of the ramp 322, but on the thin end 322*b* or even the lower part 32 of the outer housing 3 in front of the thin end 322*b* of the ramp. The cable 4 is still fed out of the protective housing 1 through the cable opening 315, even though this is not shown in the simplified illustration of FIG. 5.

As can be seen, the inner housing 2 together with the connector 5 is slightly inclined in the connecting position so that the electrical contact is oriented slightly upwards in the drawing plane, thus away from the flap 34. This has the advantage that the electrical contact thus moves slightly more away from the flap 34, making it easier to connect the terminal to the connector 5. In addition, the mechanism of the engagement recess 331 already explained in connection with FIG. 5 is thus improved. Since the force applied to the connector 5 when connecting the terminal always acts in the direction of the connector 5, the inclination of the connector 5 can reduce the likelihood of the guide element 23 slipping out of the engagement recess 331. The inclination is due to the fact that the difference in height between the thick end 322*a* and the thin end 322*b* of the ramp 322 is greater than the distance between the respective lower edges of the engagement recess 331 and the remaining sliding track 33.

Finally, the transfer of the protective housing 1 from the initial state to the connection state by a user is explained below with reference to all figures.

As already explained, the actuating element 21 has a step in cross-section (FIG. 3) and the elongated hole 313 has a widening 314 (FIG. 1). The dimensions of the actuating element 23 are selected such that the thicker (lower) portion 212 can protrude into the widening 314 but cannot be fed through the narrow portion of the elongated hole 313. The dimensions of the thinner (upper) portion 212, on the other hand, are selected such that it can be fed through the elongated hole 313.

To enable movement of the actuating element 23 along the elongated hole 313 and thus movement of the inner housing 2 including the connector 5, the user must first press the actuating element 23 in the vertical direction (in the drawing plane) since the thicker portion 212 of the actuating element 21 does not fit through the narrower elongated hole 313. This is made possible by the fact that the actuating element 21 is fastened to the inner housing 2 only on one side, which slightly deforms by the pressure (see explanations for FIG. 3 above). Once the thicker portion 212 is fully sunk in the outer housing 3, the actuating element 21 can be fed by the user in a horizontal (level) direction through the elongated hole 313 (translation of the actuating element 23). By the principle that an implementation of the change of state is only possible by the sequential execution of two movements (push then slide), the risk of an unintentional change of state of the protective housing 1 is greatly reduced and a “simple child lock-type device” is implemented. Of course, combinations of other movements, such as turning/sliding, sliding in direction 1/sliding in direction 2, as well as simultaneous and non-sequential execution of the movements are also possible to achieve the described goal.

Due to this horizontal movement, the connector 5 contacts the flap 34 and opens it as the movement continues, thereby pushing the electrical contact 51 out of the protective housing 1. The steady sliding of the inner housing 2 down the ramp 322 of the outer housing 3 results in an ever-increasing inclination of the connector 5. As soon as the guide element 23 of the inner housing 2 reaches the engagement recess 331, it sinks into it.

In FIGS. 2 and 5, it can be seen that, as already mentioned above, the engagement recess 331 is wider than the diameter of the guide element 23, which is round in cross-section. The result of this is that even after the guide element 23 has engaged in the engagement recess 331, a slight movement of the inner housing 2 in the horizontal direction is possible. Furthermore, the flap 34 has an over-opening element 342 formed from a nose projecting from the flap 34 and a plane adjoining the nose. When the guide element 23 is moved further in the horizontal direction in the engagement recess 331 until it reaches the front edge (towards the flap 34) of the engagement recess 331, the plane surface of the over-opening element 342 aligns with the plane surface of the contacting inner housing 2, resulting in an opening of the flap 34 with an opening angle greater than 90° (“over-opening”). The opening angle is measured between the flap position during the over-opening and the flap position in the closed state. Due to the over-opening, the distance between the flap 34 and the electrical contact 51 of the connector 5 increases and improves the user-friendliness. In this state, the terminal can thus be connected.

All movement of the inner housing 2 is performed against the force of a reset mechanism which is not shown in the figures. The reset mechanism can be implemented, for example, by means of rubber bands or springs between the inner housing 2 and the outer housing 3 and has the task of automatically resetting the system to its initial state as soon as no terminal is connected to the connector 5 or the user does not deliberately work against the reset mechanism.

By the guide element 23 engaging in the engagement recess 331 of the sliding track 33, it can be achieved that the substantially horizontally acting force of the reset mechanism between the inner housing 2 and the outer housing 3 is not able to independently reset the system to the initial state, since this would require the application of a force acting vertically upwards in the drawing plane.

However, this force can be applied by a reset mechanism of the flap 34 which, for example, is likewise implemented by a spring or a rubber band and which is configured in such a manner that it always exerts a force in the closing direction on the flap 34 opening downwards in the drawing plane. Thus, the reset mechanism strives to always close the flap 34 and keep it closed. Thus, when the protective housing is transferred from the initial state to the connection state, this force must also be overcome. When the flap 34 is closed by the reset mechanism, it abuts against the connector 5 from below and thus exerts a force component acting vertically upwards on the connector 5. In this case, the force required to lift the guide elements 23 out of the engagement recess 331 into the horizontally extending groove of the guide track 33 can also be transmitted by a positioning lever which is fastened directly to the flap 34 and, when the force is applied to the flap by the reset mechanism, contacts the connector 5 and transmits the force before the flap itself comes into contact with the connector 5.

In the case where the electrical terminal is connected to the connector 5, the flap 34 is kept open by the weight of the terminal against the force of the reset mechanism of the flap 34. When the terminal and the connector 5 are disconnected, the flap 34 is pushed by its reset mechanism from below (in the drawing plane) against the connector 5, causing the latter and thus the inner housing to experience a vertical upward force (in the drawing plane). This upward force causes the guide element 23 to be lifted out of the engagement recess 331, whereby the reset mechanism of the inner housing is able to return the inner housing to its initial position. Thus, no user intervention is required during the transfer from the connection state to the initial state.

REFERENCE LIST

1 protective housing
2 inner housing
21 actuating element
211 thinner portion (of the actuating element)
212 thicker portion (of the actuating element)
22 fastening element/grub screw
23 guide element
3 outer housing
31 upper part (of outer housing)
311 connection recess
312 plug connection
313 elongated hole
314 widening
315 cable opening
32 lower part (of outer housing)
321 connecting element
322 ramp
**322*a*** thick end (of ramp)
**322*b*** thin end (of ramp)
33 sliding track
331 engagement recess

34 flap
341 joint
342 over-opening element
4 cable
5 (electrical) connector
51 electrical contact

The invention claimed is:

1. A protective housing for an electrical connector, having an inner housing configured to accommodate the electrical connector and an outer housing configured to accommodate the inner housing, wherein the inner housing and the outer housing are configured to allow a movement of the inner housing within the outer housing exclusively along a defined trajectory for transferring the inner housing from an initial position to a connecting position, the trajectory aligned with a direction of an electrical terminal engaged by the connector;

the outer housing having at least one sliding track configured to define the trajectory of the inner housing within the outer housing, and the inner housing has at least one guide element configured to be guided in the at least one sliding track of the outer housing;

the sliding track having a recess for defining a nonlinear trajectory between the initial position and the connecting position for engaging the electrical terminal.

2. The protective housing according to claim 1, wherein the inner housing has a fastening element, in particular a grub screw, configured to fix the connector in the inner housing, and/or an actuating element configured to act as an interface to a user.

3. The protective housing according to claim 2, wherein the protective housing is configured to allow a movement of the inner housing only by two different, in particular sequentially performed movements of the actuating element.

4. The protective housing according to claim 1, wherein the outer housing, on one side of the protective housing, has a closable opening configured to open and close depending on the movement of the inner housing.

5. The protective housing according to claim 4, wherein the closable opening is implemented by a flap having in particular an over-opening element configured to open the flap at an angle greater than 90° depending on the position of the inner housing.

6. The protective housing according to claim 5, wherein the flap comprises a reset mechanism configured to exert a force on the flap to close or keep closed the closable opening depending on the position of the inner housing, wherein the reset mechanism is formed in particular by means of at least one spring or at least one rubber band.

7. The protective housing according to claim 1, wherein the outer housing has a ramp on an inner side which is in particular wedge-shaped and which is configured to serve as a supporting surface for the inner housing, wherein the ramp has a thick end and a thin end in the height direction and is further configured such that the inner housing rests on the thick end of the ramp in the initial position and on the thin end of the ramp in the connecting position.

8. The protective housing according to claim 1, wherein the protective housing has a reset mechanism configured to exert a force on the inner housing for establishing the initial position, wherein the reset mechanism has in particular at least one spring or at least one rubber band.

* * * * *